March 21, 1933.  S. I. VAUGHN  1,902,111
METAL JOINT AND METHOD OF FORMING THE SAME
Filed Sept. 27, 1929
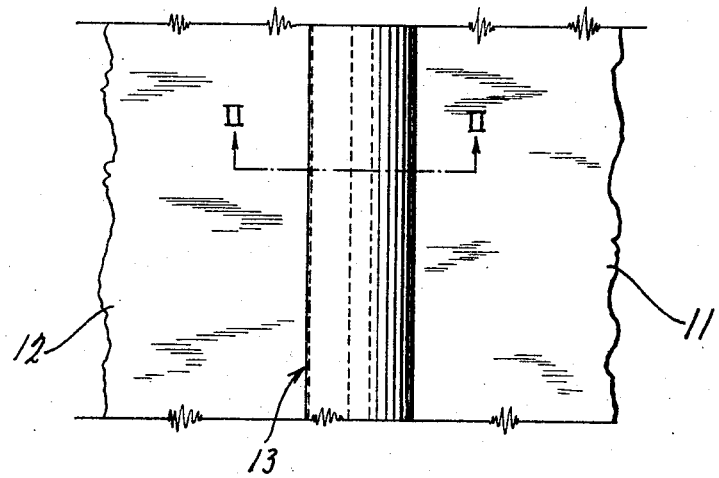
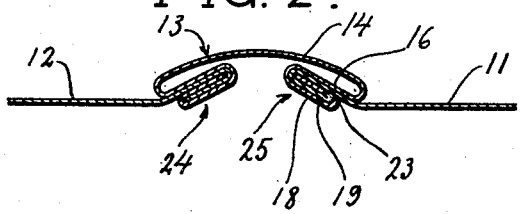
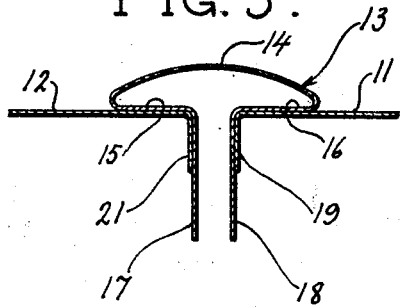
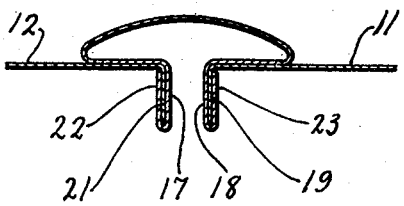
INVENTOR
STANLEY I. VAUGHN
BY
ATTORNEY Patented Mar. 21, 1933

1,902,111

UNITED STATES PATENT OFFICE

STANLEY IRVING VAUGHN, OF HEMPSTEAD, NEW YORK, ASSIGNOR TO CURTISS AEROPLANE & MOTOR COMPANY, INC., A CORPORATION OF NEW YORK

METAL JOINT AND METHOD OF FORMING THE SAME

Application filed September 27, 1929. Serial No. 395,539.

My invention relates to methods and means for forming metal joints and more particularly metal joints having characteristics suitable for joining the cover plates used in constructing airplane fuselages.

Prior to my invention plates forming the covers of fuselages of airplanes have been joined by riveting. Such a process has several disadvantages. It takes considerable time and forms a joint which is lacking in smoothness on both the interior of the fuselage and in the exterior thereof. Moreover, the joints at the rivets are likely to become loose on account of the vibrations to which they are subjected.

One of the objects of my invention is to provide methods of and means for joining the plates of a fuselage at a much greater speed than has hitherto been possible.

A further object of my invention is the attainment of smoothness both exteriorly and interiorly of the fuselage in order that wind resistance may be minimized and greater available space may be furnished within the fuselage.

A further object is to improve the appearance of airplane fuselages.

A further object is to increase the strength of airplane fuselages.

Further objects will be apparent from a reading of the subjoined specification and claims and from a consideration of the drawing.

In order to explain the invention more clearly, one embodiment thereof is shown in the accompanying drawing, in which:

Fig. 1 is a plan view of a small portion of a fuselage constructed in accordance with my invention.

Fig. 2 is a sectional view of the portion of fuselage shown in Fig. 1 taken substantially on the line II—II of Fig. 1;

Fig. 3 is a view similar to Fig. 2 illustrating one stage in the process of forming my improved lock; and Fig. 4 is a view similar to Figs. 2 and 3 showing another stage in the said process.

The lock used for illustration of my invention is adapted for monocoque fuselage construction as well as for the construction of fuselages of the truss type. In either type of construction, a plurality of plates may be joined to form a cover for the fuselage. These cover plates may extend longitudinally of the fuselage, and may be suitably curved and shaped to form a stream line contour. They may be joined by suitable means at the point at which the edges approach each other. Hitherto, this joining process has usually been by overlapping the adjacent edges and forcing rivets therethrough. In the apparatus used for illustration of my invention a suitable locking strip, which may be of the same material as the plates, is provided and placed to partially overlie and partially entend between the adjacent edges of the cover plates. The ends of the locking strip and the adjacent edges of the cover plates are then suitably bent to form a secure, smooth and neat joint and lock for the plates.

Referring particularly to the drawing, I have shown parts of two plates 11 and 12 which may be used as the cover plates of the fuselage. A connecting strip generally designated 13 (see Fig. 3) comprises a curved portion 14, two retroverted portions 15 and 16 and two inwardly extending parallel flanges 17 and 18. The ends of the plates 11 and 12 are first bent substantially perpendicularly inward as at 19 and 21 and the connecting strip 13 is positioned with the flanges 17 and 18 between and parallel to the portions 19 and 21. The ends of the flanges 17 and 18 are bent outward around the portions 19 and 21 to form folds 22 and 23 (see Fig. 4). Thereafter, the parallel folds 17, 21 and 22 and the similar parallel folds 18, 19 and 23 are again turned outward to form the locks 24 and 25 shown in Fig. 2.

In the process of forming the improved lock, the member 13 may be shaped as shown in Fig. 3 by drawing it through a die. The plates which are to be joined are then placed in suitable forms and their edges are bent inward as shown at 19 and 21 in Fig. 3. The plates are then placed in juxtaposition in suitable forms and the connecting member 13 is placed over the joint with the flanges 17 and 18 extending between the parallel portions 19 and 21. A bending tool is then passed along the joint from one end of the fuselage to the other. This action bends the inner end of the flanges 17 and 18 outward into the positions of the folds 22 and 23 in Fig. 4. The bending tool or one similar thereto is then again passed from one end of the joint to the other and bends the inwardly protruding folds upward into substantially parallel relationship with the portions 15 and 16 and with the main body of the pates 11 and 12. This operation is extremely fast as compared with joining by rivets and may be accomplished in about one tenth of the time it would take to rivet the materials.

As stated above, I may use my improved process in the joining of cover plates of fuselages of either the truss type or the monocoque type. In constructing a fuselage of the monocoque type, the connecting operation is repeated for adjacent plates until about one half of the fuselage is completed. The other half is completed in similar manner and thereafter the two halves may be joined to each other in a similar manner to that in which the individual plates are joined. As a support for the fuselage cover halves I prefer to use one or more formers made up of I beams such as those shown in my prior Patent No. 1,682,202, though any other suitable formers may be used.

It is to be understood that the above described embodiment of the invention is for the purpose of illustration only and various changes may be made therein without departing from the spirit and scope of the invention.

I claim as my invention:

1. In metallic structure, a pair of plates each having one edge adjacent to an edge of the other and having the adjacent edges bent back substantially parallel with the main body of the plates, a strip comprising a dome portion, a pair of retroverted portions overlying and contacting with the adjacent edges of the plates, flanges extending from the retroverted portions and folded back under the bent back portion of the plates, and an additional fold for each of the flanges positioned between the main body of its associated plate and the bent back portion thereof.

2. In a metallic structure, a pair of plates positioned with one edge of one plate adjacent to an edge of another plate and having their adjacent edges bent back substantially parallel with the main body of the plate, and a lock for connecting the said plate comprising a strip bent to have at least three substantially parallel folds interlocking with and substantially parallel to the substantially parallel portions of the plates.

3. In a metallic structure, a pair of plates positioned with one edge of one plate adjacent to an edge of another plate and having their adjacent edges bent back substantially parallel with the main body of the plate, and a lock for connecting the said plates comprising a strip bent to have at least four substantially parallel folds interwoven with and substantially parallel to the substantially parallel portions of the plates.

4. A lock for metallic plates which comprises a strip adapted to have a part positioned between the metallic plates and a part bent around adjacent edges thereof, said strip having a dome portion extending longitudinally thereof, a pair of retroverted portions turned back substantially parallel to the dome portion, and a pair of flanges extending substantially perpendicularly from the retroverted portions.

5. The method of joining metallic plates which comprises bending the edges of the plates substantially perpendicular to the main body of the plates, forming a connecting strip having flanges, positioning a part of the connecting strip to overlie the adjacent edges of the plates and inserting the flanges of the connecting strips between the edges of the plates, folding the ends of the flanges around the bent edges of the plates to form an interlock for the plates and turning the bent edges of the plates and both folds of the flanges further backward into substantially parallel relationship with the main body of the plates to form a comparatively smooth surface.

6. The method of joining metallic plates which comprises bending the edges of the said plates in a form, drawing through a die a connecting strip having a body portion and flanges, positioning the bent edges of the plates adjacent to each other, placing the body portion of the strip to overlie the edges of the plates, inserting the flanges of the strip between the adjacent bent edges of the plates, folding the ends of the flanges around the bent ends of the plates, and turning the bent ends of the plates and the folded ends of the flanges further backward into substantially parallel relationship with the main body of the plates to form a lock connection for the two plates and a substantially smooth surface at said connection.

7. The method of joining metallic plates which comprises bending the edges of adjacent plates, disposing said plates opposite one another with their bent edges spaced apart, drawing through a die a connecting strip to form thereon a hollow dome and a pair of flanges, positioning the connecting strip so that a part thereof overlies the adjacent edges of the plates and the hollow dome communicates with the space between the bent edges of the plates and the flanges are inserted between the bent edges of the plates, folding the ends of the flanges around the bent edges of the plates, and turning the bent edges of the plates and the folded ends of the flanges further backward until they lie substantially within said hollow dome.

8. The method of joining metallic plates which comprises bending the edges of said plates, forming a connecting strip having a body portion and flanges, placing the bent edges of the plates adjacent to each other, inserting the flanges of the strip between the adjacent bent edges of the plates, folding the end portions of the flanges around the bent edges of the plates so that they lie flat against the edges of the plates, and folding the first folds in their entirety back against the plates.

9. The method of joining metallic plates which comprises bending the edges of said plates, forming a connecting strip having a body portion and flanges, placing the bent edges of the plates adjacent to each other, inserting the flanges of the strip between the adjacent bent edges of the plates, folding the end portions of the flanges around the bent edges of the plates so that they lie flat against the edges of the plates, folding the first folds in their entirety back against the plates, and folding the last mentioned folds in their entirety at an angle to the plates to lie within the body portion of the strip.

In testimony whereof I hereunto affix my signature.

STANLEY IRVING VAUGHN.